United States Patent [19]

Christopherson

[11] Patent Number: 5,079,072
[45] Date of Patent: Jan. 7, 1992

[54] POLYMERIC FILMS

[75] Inventor: Roy Christopherson, Bridgewater, England

[73] Assignee: Courtaulds Films & Packaging (Holdings) Ltd., England

[21] Appl. No.: 396,344

[22] Filed: Aug. 21, 1989

[30] Foreign Application Priority Data

Aug. 26, 1988 [GB] United Kingdom ............... 8820308

[51] Int. Cl.$^5$ ............................................. B32B 7/02
[52] U.S. Cl. ................................. 428/213; 428/349; 428/474.4; 428/483; 428/520; 428/518
[58] Field of Search ............... 428/518, 516, 349, 213, 428/474.7, 483, 480, 520

[56] References Cited

U.S. PATENT DOCUMENTS

| | | | |
|---|---|---|---|
| 4,678,836 | 7/1987 | McKinney et al. | 525/221 |
| 4,909,881 | 3/1990 | Garland | 428/518 |

FOREIGN PATENT DOCUMENTS

| | | |
|---|---|---|
| 0070678 | 1/1983 | European Pat. Off. . |
| 0136059 | 4/1985 | European Pat. Off. . |
| 0245034 | 11/1987 | European Pat. Off. . |
| 0269325 | 6/1988 | European Pat. Off. . |
| 1472376 | 5/1977 | United Kingdom . |
| 2084924 | 4/1982 | United Kingdom . |
| 2131739 | 6/1984 | United Kingdom . |
| 2211464 | 7/1989 | United Kingdom . |

*Primary Examiner*—Edith L. Buffalow
*Attorney, Agent, or Firm*—Bacon & Thomas

[57] ABSTRACT

Polymeric films, especially for packaging, consist of a relatively thick layer of a polyolefin having thereon a relatively thin layer of a blend of a polymer which has a low heat seal strength to polyvinylidene chloride and a copolymer containing units derived from an alkene and an unsaturated mono-basic carboxylic acid or an ester thereof. The relatively thick layer is preferably of polypropylene, and the relatively thin layer is preferably a blend of polyethylene with a copolymer containing at least 74 percent by weight of units derived from ethylene and not more than 36 percent by weight of units derived from acrylic acid or an ester thereof. The relatively thin layer has good anti-block with the relatively thick layer and to other layers such as PVdC applied thereto, and the relatively thin layers have good heat seal strengths to themselves and such other layers.

19 Claims, No Drawings

POLYMERIC FILMS

This invention concerns polymeric films, for example for use in packaging.

It is known to impart various surface characteristics to polymeric films depending on the intended end use of the films. Thus films used in high speed packaging machinery are often treated with an anti-block agent to prevent them blocking to themselves during the packaging process. Heat-sealable surfaces are provided to enable polymeric films to be heat sealed to themselves to form packages, and various coatings are provided to impart printability or to aid lamination to other layers, for example using overlacquers of polyvinylidene chloride (PVdC). In practice, anti-block agents tend to reduce the efficiency for example of heat seal layers.

According to the present invention there is provided a polyolefin film comprising a relatively thick layer of a polyolefin having thereon a relatively thin layer of a blend of a polymer which has a low heat seal strength to polyvinylidene chloride and a copolymer containing units derived from an alkene and an unsaturated mono-basic carboxylic acid or an ester thereof.

The heat seal strength of the polymer having a low heat seal strength to PVdC is preferably less than 50g/25cm as measured at ambient temperature after contact for 1 second at 115° C. under a load of $9.5 \times 10^6$ Pa.

The surfaces of the relatively thin layers of films of the present invention have shown good anti-block to the surfaces of the relatively thick layer and to other layers applied to the relatively thick layer, e.g. PVdC coatings, and also good heat seal strengths to themselves and to such coatings. The relatively thin layers also have shown good priming for PVdC.

The copolymer of an alkene and an unsaturated mono-basic carboxylic acid or an ester thereof preferably contains units derived from at least one of ethylene, propylene and but-1-ene, optionally with a higher homologue thereof, e.g. hex-1-ene or oct-1-ene. The unsaturated mono-basic carboxylic acid is preferably acrylic acid, it being particularly preferred that the copolymer contains units derived from an acrylic acid ester. Especially preferred are ethylene/acrylic ester copolymers.

The copolymer can consist of units derived from one or more alkenes and an unsaturated carboxylic acid or an ester thereof, or it can additionally contain units derived from at least one unsaturated dicarboxylic acid or acid anhydride, preferably maleic anhydride. Preferred copolymers for use in the present invention will usually contain at least 65 percent by weight of units derived from an alkene, e.g. ethylene, the amount of units derived from the unsaturated acid and/or ester thereof being not greater than 35 percent by weight of the copolymer. The amount of unsaturated acid and/or ester thereof is more preferably from 10 to 20, especially from 14 to 18, and advantageously about 17 percent by weight of the copolymer.

Preferred terpolymers contain at least 65 percent by weight of units derived from an alkene, with the unsaturated acid and/or ester content being not greater than 29 percent of the terpolymer. The amount of units derived from the dicarboxylic acid or acid anhydride is preferably less than 6, more preferably from 2 to 4, and advantageously about 3, percent by weight of the terpolymer.

The unsaturated acid ester can be one or more esters of the acid with a lower ($C_{1-4}$) alkanol, i.e. methyl, ethyl, n-propyl, i-propyl, n-butyl, i-butyl, sec-butyl or t-butyl esters.

Various polymers can be used as the polymer which has a low heat seal strength to polyvinylidene chloride. Linear low, low, medium and high density polyethylene for example, have shown seal strengths to polyvinylidene chloride of from 2 to 6g/25cm in heat seal tests in which seals were made at 115° C. using a force of $9.5 \times 10^6$ Pa with a dwell time of 1 second. Other polymers which can be used which exhibit low heat seal strengths include polypropylene (heat seal strength 2g/25cm), polyesters (typical heat seal strength 17g/25cm), polystyrene (heat seal strength 5g/25cm) and copolyamides (typical heat seal strength 31g/25cm). These should be compared with the heat seal strength of over 350g/25cm for a typical ethylene/acrylic ester/maleic anhydride terpolymer which in accordance with the invention can be used in the layer of a blend having good seal strength and acceptable anti-block properties.

When polyethylene in particular is used in the blend, the physical properties of the blend usually depend on the density of the polyethylene and the amount of copolymer present. If the amount of polyethylene in the blend is too low, the relatively thin layer can block to itself and to a polyvinylidene chloride overlacquer, whereas the heat sealability of the blend to polyvinylidene chloride can decrease to unacceptably low levels at relatively high levels of polyethylene. This also means that if the copolymer contains relatively large amounts of units derived from an acrylic ester, the relatively thin layer of the blend can block, possibly due to softening of the copolymer caused by the relatively high content of units derived from an unsaturated acid and/or an ester thereof. This latter effect can be reduced by the inclusion in the copolymer of units derived from maleic anhydride which generally increases the printability of the blend without softening the copolymer to the same extent as if the same amount of unsaturated acid and/or ester is present. However, relatively large amounts of maleic anhydride can reduce the heat sealability of the blend to polyvinylidene chloride.

If the polyethylene in the blend has a density of 0.910 to 0.925 g.cm$^{-3}$ (linear low density polyethylene—LLDPE), the blend preferably contains 20 to 40 percent by weight of polyethylene. Low and medium density polyethylene (LDPE and MDPE) having a density in the range of from 0.925 to 0.940 g/cm$^3$ preferably represents from 10 to 30 percent of the blend. At higher densities (high density polyethylene HDPE) of at least 0.940 g/cm$^3$ the polyethylene content of the blend is preferably from 5 to 15 percent by weight.

When a blend of a copolyamide with the alkene/unsaturated acid and/or ester copolymer is used, the amount of copolyamide present is preferably from 5 to 30 weight percent of the relatively thin layer, and more preferably from 5 to 15 weight percent.

Polyolefin films of the present invention can consist of the two specified layers only. However, both sides of the relatively thick layer can have a relatively thin layer of a blend of polyethylene with the copolymer thereon, the relatively thin layers being the same or different.

If a second, relatively thin layer of a blend is not present, the relatively thick layer of polyolefin, for example polypropylene, is preferably treated to provide adhesion for a primer coating for a subsequently applied polyvinylidene chloride overlacquer. A preferred treatment is to provide the relatively thick layer of polyolefin with a layer of a propylene/ethylene copolymer, the propylene/ethylene copolymer preferably containing from 2 to 6, and more preferably about 4 percent by weight of units derived from ethylene. This layer is preferably treated to provide adhesion for a primer coating for a subsequently applied PVdC overlacquer.

The relatively thick layer can be a clear polyolefin or it can be voided, for example by the inclusion of an organic or inorganic voiding agent in the polyolefin.

The relatively thick layer will usually be from 15 to 70 microns thick. However, the relatively thin layer or layers of the blend or the optional propylene/ethylene copolymer will usually be less than 5 microns thick, and preferably from 0.5 to 3.5 microns thick.

When the relatively thick layer is voided and has only one relatively thin layer of the blend thereon, it is preferred that the relatively thick layer has a layer of clear olefin homopolymer thereon. For example, a relatively thick layer of voided propylene homopolymer preferably has a relatively thin layer of the blend on one side and a layer of non-voided propylene homopolymer on the other side. Such non-voided layers, for example from 1.5 to 5.5 microns thick, can provide films of the present invention with a particularly glossy appearance. Furthermore, it is possible to provide such non-voided layers with coatings, for example of an acrylic polymer.

Films of the present invention are preferably produced by coextruding a layer of the polyolefin with a layer of the blend, and optionally with the other layers, as desired. Thereafter the extruded web of two or more polymer layers will usually be stretched biaxially to effect orientation, and when a voiding agent, e.g. an organic or inorganic particulate material, is present, to effect voiding of the layer containing the voiding agent. The stretching is conveniently effected sequentially, orientation being effected in the direction of extrusion, for example using heated rollers, and thereafter in the transverse direction using a stenter. This also allows coating materials to be applied to the film before the final orientation step, for example the acrylic coating applied to films having a glossy layer of non-voided homopolymer on a voided relatively thick layer referred to above.

If desired, particulates can be added to the thin layer to provide the films with known properties, e.g. improved slip. Examples of materials which can be used include silica and aluminum silicate.

After orientation, the films are preferably subjected to a surface treatment to improve printability and/or heat sealability, for example using corona discharge or flame treatment. This treatment can be applied to either or both sides of the film, depending on the properties required for the film. It is, however, generally preferred to subject the blend to such a treatment.

The following Examples are given by way of illustration only. All parts are by weight unless otherwise stated.

Examples

A series of polymeric films was produced by first coextruding a propylene homopolymer core layer with a layer of a propylene/ethylene copolymer (4% by weight of units derived from ethylene) on one side and a layer of various blends of polymers containing 1000 ppm of 5 micron particle size silica on the other side, and then biaxially stretching the web. The webs were each stretched by 4.5:1 in the machine direction using hot rollers, and by 10:1 in the transverse direction using a stenter.

The resulting films were corona discharge treated on both faces and then wound up. The films were 25 microns thick with a core 23.4 microns thick and outer layers each 0.8 microns thick.

The heat seal strengths of each film were then measured for the surfaces of the films consisting of the blend of polymers, the seal strengths to PVdC and to themselves being measured at 115° C. using a dwell time of 1 second under a load of $9.5 \times 10^6$ Pa. The results are given in the accompanying Table in units of g/25cm.

Anti-block was evaluated for each film by contacting the polymer blend surface of 6.3 cm samples of the film with a PVdC layer on a sample of a polymer film of the same size, and between paper sheets of the same size, the film sample being heated for 6 hours at 42° C. while under a load of 9.5 kg. After cooling the samples for 10 minutes, anti-block was evaluated on the following scale by the ease with which the two samples of film could be separated:

1. no blocking—samples fall apart from each other;
2. light pressure required to separate the samples;
3. medium pressure required to separate the samples;
4. heavy pressure required to separate the samples;
5. samples inseparable by touch.

Acceptable antiblock is considered to be not more than 3–4, i.e. medium to high pressure is required to separate the samples.

TABLE

| Example | Tested Polymer Surface | Self Heat Seal | PVdC Heat Seal | Anti-block |
|---|---|---|---|---|
| 1 | 90% Terpolymer A/ 10% HDPE (density 0.952 g/cm³) | 350+ | 300 | 2–3 |
| 2 | 75% Terpolymer A/ 25% LDPE (density 0.93 g/cm³) | 330 | 280 | 3 |
| 3 | 70% Copolymer B/ 30% LLDPE (density 0.924 g/cm³) | 400 | 350 | 3–4 |
| 4 | 90% Terpolymer A/ 10% Copolyamide C | 280 | 220 | 2–3 |
| 5 | 85% Terpolymer A/ 15% Polypropylene D | 250 | 200 | 3 |
| — | HDPE (density 0.952 g/cm³) | | | 2 |
| — | LDPE (density 0.93 g/cm³) | | | 5 |
| — | LLDPE (density 0.924 g/cm³) | | | 6 |
| — | Copolyamide C | | | 31 |
| — | Polypropylene D | | | 2 |
| — | Terpolymer A | | | 350+ |
| — | Copolymer B | | | 350+ |

Notes
Terpolymer A - 91% ethylene, 6% ethyl acrylate, 3% maleic anhydride
Copolymer B - 83% ethylene, 17% ethyl acrylate
Copolyamide C - Density 1.09 g/cm³, melting point 160° C.
Polypropylene D - Melt flow index of 3 at 230° C. under ASTM D1238/73 (condition L)

What is claimed is:

1. A polyolefin film comprising a first layer of a polyolefin and a second layer having a thickness less than that of said first layer, the second layer comprising a blend of a polymer which has a low heat seal strength to polyvinylidene chloride and is selected from the group consisting of polyesters, polystyrene and copolyamides in admixture with a copolymer containing units derived from an alkene and an unsaturated mono-basic carboxylic acid or an ester thereof.

2. A film according to claim 1, wherein the said alkene is ethylene, propylene or but-l-ene.

3. A film according to claim 1, wherein the unsaturated mono-basic carboxylic acid is acrylic acid.

4. A film according to claim 1, wherein the said copolymer is an ethylene/acrylic ester polymer.

5. A film according to claim 1, wherein the layer of relatively thick polyolefin is of polypropylene.

6. A film according to claim 1, wherein the first layer has a layer of the blend on each surface.

7. A film according to claim 1, wherein the said copolymer is a copolymer containing not more than 35 percent by weight of units derived from the unsaturated carboxylic acid or ester thereof.

8. A film according to claim 7, wherein the said copolymer contains from 10 to 20 percent by weight of units derived from an acrylic ester.

9. A film according to claim 1, wherein the said copolymer contains units derived from an unsaturated dicarboxylic acid or anhydride thereof.

10. A film according to claim 9, wherein the unsaturated dicarboxylic acid anhydride is maleic anhydride.

11. A film according to claim 9, wherein the said copolymer contains at least 74 percent by weight of units derived from ethylene.

12. A film according to claim 11, wherein the said copolymer contains not more than 20 percent by weight of units derived from the unsaturated acid or ester thereof.

13. A film according to claim 10, wherein the said copolymer contains not more than 6 percent by weight of units derived from maleic anhydride.

14. A film according to claim 13, wherein the said copolymer contains from 2 to 4 percent by weight of units derived from maleic anhydride.

15. A film according to claim 1, wherein the blend has been treated to improve its sealability to PVdC.

16. A film according to claim 1, wherein the first layer has the second layer on one side, and the other side has been treated to improve print adhesion or has been provided with a polyvinylidene chloride overlacquer.

17. A film according to claim 16, wherein the said other side has a propylene/ethylene copolymer layer thereon.

18. A film according to claim 1, wherein the first layer is clear.

19. A film according to claim 1, wherein the first layer is voided.

* * * * *